Patented Nov. 20, 1928.

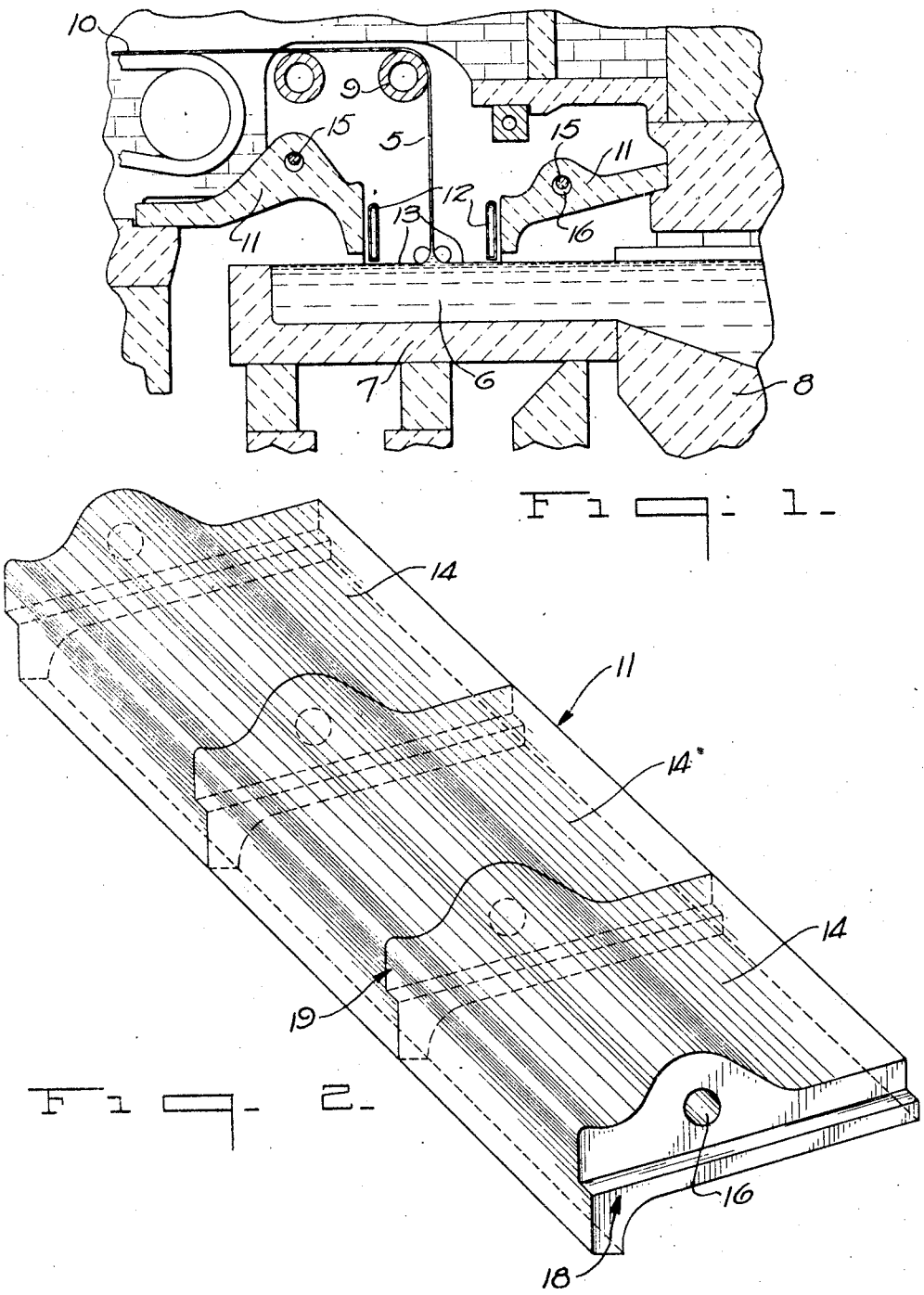

1,692,673

UNITED STATES PATENT OFFICE.

NESTOR MAMBOURG, OF LANCASTER, OHIO, ASSIGNOR TO THE LIBBEY-OWENS SHEET GLASS COMPANY, OF TOLEDO, OHIO, A CORPORATION OF OHIO.

SHEET-GLASS APPARATUS.

Application filed September 11, 1926. Serial No. 134,823.

The present invention relates to sheet glass apparatus, and has particular reference to a lip tile therefor.

An important object of the invention is to provide in sheet glass apparatus a lip tile comprising a plurality of separable sections, which permits an easy and quick replacement of any part or the whole of said lip tile.

Still another object of the invention is to provide in sheet glass apparatus a sectional lip tile, each section of said lip tile having preferably a portion cooperating with portions on adjacent sections so that the tile in use will be entirely satisfactory as a single piece tile.

Still another object of the invention is to provide in sheet glass apparatus a draw pot containing a mass of molten glass, and a lip tile arranged over the molten glass, said tile comprising a plurality of sections, the joints between the sections extending longitudinally of said draw pot.

Other objects and advantages of the invention will become apparent during the course of the following description.

In the drawings wherein like numerals are employed to designate like parts throughout the same, Fig. 1 is a fragmentary sectional view of a form of sheet glass drawing apparatus illustrating the invention in use, and Fig. 2 is a perspective view of the invention.

The present invention relates particularly to the Colburn machine, although it is not necessarily limited to such construction.

In the Colburn machine, as set forth in Patent 1,248,809, a sheet of glass 5 is continuously drawn from a mass of molten glass 6 contained in a draw pot 7, arranged in open communication with and supplied with molten glass from a tank furnace 8. The sheet 5 is drawn initially in a vertical plane, after which it is passed over a deflecting member 9 into the horizontal plane 10. Arranged over the molten glass 6 in the pot 7 are lip tiles 11 which are shaped to deflect heat and gases from the furnace downwardly upon the surface of the glass. The lip tiles in conjunction with the lip tile coolers 12 also shield the sheet of glass 5 from the said heat and gases, and also permit an exposure of the molten glass at the points 13 to the atmosphere, which assists in conditioning the glass to permit the drawing of the sheet 5.

It has been customary heretofore to make the lip tiles in a single piece. Oftentimes it is necessary to remove the tiles and place new ones in position. The temperature surrounding the machine at this point is exceptionally high, and the clearance allowed for the removal and insertion of a lip tile is so small that the job of taking the lip tile out or putting a new one in is exceptionally difficult. On the smaller machines wherein a relatively narrow sheet is produced, the lip tile question is not quite so serious, but on the wide machines this lip tile question is serious both from the manufacture of the lip tile and the placement of the lip tile in an operative position after it has been made. Quite a problem is encountered in the manufacture of a single piece tile, especially in the seasoning of it after it has been molded.

To overcome these difficulties I have provided a lip tile which may be constructed substantially as shown in Fig. 2. The tile designated in its entirety by the numeral 11 comprises a plurality of sections 14, which sections may be associated and supported upon a rod 15 received in the openings 16 as shown in Fig. 1.

The sections 14 are threaded on the support 15 in a manner that the joints 17 extend longitudinally of the tank furnace and pot. Each section is preferably provided with a large portion 18, and an overhanging portion 19, said portions cooperating in a manner to produce a continuous surface when the sections are assembled in operative position on a glass machine. Heretofore, it has been generally accepted that nothing but a one piece lip tile can be satisfactorily used, and in fact lip tiles have been removed as soon as a crack develops. I have found, however, in actual use that a lip tile constructed in accordance with the present disclosure will operate perfectly satisfactory when in use. Obviously, the difficulties in handling the lip tiles are greatly reduced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for drawing a sheet from a mass of molten glass, and a lip tile arranged above the molten glass, a support therefor, said lip tile comprising a plurality of sections threaded on said support.

2. In sheet glass apparatus, means for drawing a sheet from a mass of molten glass, and a lip tile arranged above the molten glass, a support therefor, said lip tile being sectional, the joints thereof extending transversely of its support.

3. In sheet glass apparatus, means for drawing a sheet from a mass of molten glass, and a lip tile arranged above the molten glass, a support therefor, said lip tile being sectional, the joints thereof extending transversely of its support, each of said sections having a portion cooperating with its adjacent sections.

4. In sheet glass apparatus, a tank furnace containing a mass of molten glass, and a sectional lip tile arranged above the molten glass, the joints in said tile extending longitudinally of the tank furnace.

5. In sheet glass apparatus, a tank furnace containing a mass of molten glass, a sectional lip tile arranged above the molten glass, a support therefor extending transversely of the tank furnace, the joints of said tile extending transversely of its support and longitudinally of the tank furnace.

6. In combination with a sheet drawing apparatus, of a lip tile comprising a plurality of sections, the line of contact between each section extending transversely of the longitudinal axis of said lip tile.

7. In combination with a sheet drawing apparatus, of a lip tile comprising a plurality of sections, each section having a portion cooperating with its adjacent sections, the line of contact between each section extending transversely of the longitudinal axis of said lip tile.

Signed at Lancaster, in the county of Fairfield and State of Ohio, this eighth day of September, 1926.

NESTOR MAMBOURG.